United States Patent [19]
Friederichs et al.

[11] Patent Number: 6,031,056
[45] Date of Patent: *Feb. 29, 2000

[54] CATALYST SYSTEM FOR THE POLYMERIZATION OF ETHYLENE

[75] Inventors: Nicolaas H. Friederichs, Brunssum; Johannes A. M. van Beek, Maastricht; Joseph A. J. Hahnraths, Heerlen; Rutgerus A. J. Postema, Geleen, all of Netherlands

[73] Assignee: DSM N.V., Heerlen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/774,644

[22] Filed: Dec. 30, 1996

Related U.S. Application Data

[63] Continuation of application No. PCT/NL95/00225, Jun. 26, 1995.

[30] Foreign Application Priority Data

Jul. 1, 1994 [BE] Belgium ................................. 9400620

[51] Int. Cl.⁷ ...................................................... C08F 4/44
[52] U.S. Cl. ............................ 526/144; 526/352; 502/117
[58] Field of Search ...................................... 526/144, 352

[56] References Cited

U.S. PATENT DOCUMENTS

| | | | |
|---|---|---|---|
| 3,878,124 | 4/1975 | Durand et al. | 526/144 |
| 4,172,050 | 10/1979 | Gessell | 526/151 |
| 4,368,306 | 1/1983 | Kurz . | |
| 4,826,794 | 5/1989 | Coosemans et al. . | |
| 4,868,264 | 9/1989 | Evens et al. | 526/151 |
| 4,914,168 | 4/1990 | Coosemans et al. . | |
| 5,013,701 | 5/1991 | Coosmans et al. . | |
| 5,300,470 | 4/1994 | Cuffiani et al. . | |
| 5,320,994 | 6/1994 | Bujadoux et al. . | |
| 5,349,033 | 9/1994 | Thum | 526/144 |

FOREIGN PATENT DOCUMENTS

| | | |
|---|---|---|
| 1056546 | 6/1979 | Canada . |
| 0 043 582 | 1/1982 | European Pat. Off. . |
| 0 280 352 | 8/1988 | European Pat. Off. . |
| 0 280 353 | 8/1988 | European Pat. Off. . |

*Primary Examiner*—David W. Wu
*Assistant Examiner*—Ling-Siu Choi
*Attorney, Agent, or Firm*—Pillsbury Madison & Sutro LLP

[57] ABSTRACT

The invention relates to the preparation of the disclosed catalyst system and to the homo- or copolymerization of ethylene with the aid of this catalyst system. The catalyst system contains a catalyst A and a cocatalyst B which, system is suitable for the homopolymerization of ethylene or copolymerization of ethylene with one or more α-olefins having 3–12 carbon atoms and optionally one or more non-conjugated dienes. Catalyst A contains one or more organomagnesium compounds, one or more transition metal compounds, and one or more halides that do not react spontaneously with the organomagnesium compound(s). The catalyst system also contains at least one transfer agent.

24 Claims, No Drawings

CATALYST SYSTEM FOR THE POLYMERIZATION OF ETHYLENE

This is a Continuation Application (MPEP 201.09) of: International Application No. PCT/NL95/00225 filed Jun. 26, 1995 which designated the U.S.

RELATED APPLICATIONS

1. Field of the Invention

The invention relates to a catalyst system comprising a catalyst A and a cocatalyst B for the homopolymerization of ethylene or copolymerization of ethylene with one or more α-olefins having 3–12 carbon atoms and optionally one or more non-conjugated dienes, wherein catalyst A comprises one or more organomagnesium compounds, a halide and one or more transition metal compounds. The invention also relates to the preparation of the catalyst system and to the (co)polymerization of ethylene with the aid of this catalyst system.

2. Background Information

A catalyst system of this type is described in NL-A-7605544. The halide that is used in this system, however, reacts spontaneously with the organomagnesium compound (s). 'Reacts spontaneously' means that a finely dispersed insoluble material is formed when the halide is added to an organomagnesium compound dissolved in a suitable solvent, at room temperature and under atmospheric pressure. In the examples of NL-A-7605544 use is made of HCl in particular, which is a highly corrosive gas, with all the consequences that entails. In addition, tertiary butyl chloride is also used in the examples. The disadvantage of tertiary chlorides is their intrinsic reactivity. This results in reactions that are more difficult to control in the preparation of the catalyst.

SUMMARY AND OBJECTS OF THE INVENTION

The aim of the invention is to provide a catalyst system that does not present the above mentioned drawbacks and that moreover shows a very high activity at high temperatures and short residence times in the polymerization reactor, with high degrees of comonomer conversion. Moreover, this catalyst system can be prepared in a simple and controllable manner.

This aim is achieved in that the halide is an organic chloride that does not react spontaneously with the organomagnesium compound(s) and in that the catalyst system also contains at least one transfer agent.

Here and hereinafter the transfer agent is a compound that is capable of transferring to the organomagnesium compound a chlorine atom of an organic chloride that does not react spontaneously with the organomagnesium compound. 'Does not react spontaneously' means that no finely dispersed insoluble material is formed when the chloride is added to the organomagnesium compound dissolved in a suitable solvent, at room temperature and under atmospheric pressure.

Moreover, the catalyst system according to the invention has a very good combination of properties. It shows a high activity at high polymerization temperatures, the degree of comonomer conversion is very good and the molecular weight and molecular weight distribution of polyethylene can be controlled, which is very important. A broad molecular weight distribution results in good flow properties at high shear rates, in other words in good processability. A narrow molecular weight distribution in principle results in poorer processability, but better mechanical properties of the polymer. The catalyst system according to the invention and its preparation are not expensive and entail as little impact on the environment as possible. Furthermore, the polyethylene that is produced with the aid of the catalyst system according to the invention has, in principle, very low residual concentrations of halogen and transition metal. The residual concentrations of other metals, for example from the cocatalyst B and the transfer agent, are also very low.

There are already numerous catalyst systems that are capable of polymerizing ethylene and/or 1-alkenes. Such a polymerization can take place in the gas phase, in solution, in slurry, in bulk or in suspension. In solution and suspension, polymerization takes place in a solvent or a dispersing agent, respectively. If ethylene is polymerized in solution the polymerization temperature must lie above the dissolution temperature of the polyethylene. In suspension, on the contrary, polymerization takes place below the dissolution temperature of the polyethylene formed. In general, catalysts that are suitable for slurry, gas-phase, bulk and suspension polymerization are not suitable for solution polymerization.

Solution polymerization is extremely suitable if a polymerization process is required which enables rapid product-grade changes to be made. It is a process with great flexibility. This flexibility is due to the short residence time of the product in the reactor, while nevertheless polyethylene of good quality can be produced.

For a long time there has been a need for catalyst systems that can polymerize at high temperatures, this gives several advantages. The polymerization of ethylene is an exothermic reaction. That gives rise to the problem of the discharge of the polymerization heat. Cooling via the wall or by cooling devices in the reactor is of course a possibility. This can however lead to the deposition of polymer on the cooling surfaces, especially when the cooling temperature is below the melting temperature of the polyethylene. To avoid this problem of deposition it is also possible to cool the reactor feed substantially; however, this requires much energy. If the polymerization is carried out at high temperatures, the cooling of the reactor feed can be reduced or even omitted, while a high degree of ethylene conversion can nevertheless be obtained with the catalyst system according to the present invention, in other words, the catalyst system has a high activity. Moreover, less to no additional heat will then be required to evaporate the solvent in the further working-up of the polymer.

The high-temperature catalyst systems must be so active that they still show sufficient activity at polymerization temperatures of 150° C. and higher. The problem encountered with polymerization at such high temperatures is the production of polymers with a sufficiently high molecular weight.

DETAILED DESCRIPTION OF THE INVENTION

A process according to the present invention concerns the homopolymerization or copolymerization of ethylene with one or more α-olefins having 3–12 carbon atoms, and optionally one or more non-conjugated dienes, under effective polymerization conditions in the presence of a catalyst system comprised of a catalyst A and a cocatalyst B, wherein catalyst A comprises at least one organomagnesium compound, an organic halide that does not spontaneously react with the organomagensium compound(s), and at least one transition metal compound. The catalyst system also contains at least one transfer agent.

The organic chlorides that are used in the catalyst system according to the invention are chlorides that do not react spontaneously with the organomagnesium compound(s). The organic chlorides are primary and/or secondary mono-, di- or poly-(chloride)substituted alkyl, alkenyl, aryl or alkaryl chlorides, or mixtures thereof. The alkyl, alkenyl, aryl or alkaryl group may contain 1–20 carbon atoms. With a poly-(chloride)substituted compound is meant a compound with two or more chloride atoms with the chloride atoms being positioned on one or more carbon atoms.

The organic chloride can also be a cyclo- or polycyclo alkyl-, alkenyl-, aryl- or alkarylcompound with 5–20 carbon atoms. With polycyclo compound is meant a compound that contains 2 or more cyclic structures which cyclic structures can be in direct contact with each other, or which can be separated from each other by one or more carbon atoms.

The primary organic chloride is preferably chosen from the group comprising 1-chlorobutane, 1-chloropropane, chloroethane or a mixture thereof.

The secondary organic chloride is preferably chosen from the group comprising of 2-chloroheptane, 3-chloroheptane, 2-chlorobutane, 2-chloropropane or a mixture thereof.

For example also a mixture of one or more primary and one or more secondary organic chlorides can be used. Examples of such mixtures are, for example 1-chlorobutane/ 2-chlorobutane or 1-chlorodecane/2-chlorobutane. The organic chlorides of the mixture can be used simultaneously or subsequently. The ratio between the organic chlorides in these mixtures can be varied within wide ranges and the best ratio can easily be determined by the person skilled in the art. The best order in which the organic chlorides are used can also easily be determined.

The poly-(chloride)substituted compound can, for example, be 2,2-dichlorobutane, 2,2-dichloropropane, 1,3-dichlorobutane, 1,2-dichlorobutane or 1,2-dichloropropane.

The cyclo- or polycyclo-compound can be cyclopentyl chloride or chlorobenzene for example.

As transfer agent one or more (organo)aluminum compounds and/or one or more (organo)boron chlorides and/or one or more (organo)zinc compounds can, for example, be used. As the boron chloride for example borontrichloride can be used. The zinc compound can for example, be chosen from diethyl zinc or zincdichloride.

Preferably the transfer agent is an (organo)aluminum chloride. More preferred is an (organo)aluminum chloride chosen from the group comprising aluminumtrichloride, ethylaluminum dichloride, diethylaluminum chloride, sesquiethylaluminum chloride or a mixture thereof.

As the organomagnesium compound a dialkyl magnesium compound is particularly suitable. However also an alkylalkoxy magnesium compound or a dialkoxy magnesium compound can be used. The organomagnesium compound can be represented by the general formula, $R^1R^2Mg$, in which $R^1$ and $R^2$ may be the same or different and represent alkyl or alkoxy groups with 1–20 carbon atoms. Preferably the organomagnesium compound is soluble in a hydrocarbon.

Examples of organomagnesium compounds are di(n-butyl) magnesium, n-butyl-sec-butyl magnesium, diisopropyl magnesium, di(n-hexyl) magnesium, isopropyl-n-butyl magnesium, ethyl-n-hexyl magnesium, ethyl-n-butyl magnesium, di(n-octyl) magnesium, butyloctyl magnesium, diethoxy magnesium, dibutoxy magnesium, butoxy-ethoxy magnesium.

The organomagnesium compound is preferably ethylbutyl magnesium, butyloctyl magnesium, dibutyl magnesium and/ or dihexyl magnesium, which may or may not be converted with at most two molar equivalents of an alcohol, relative to the magnesium, into an alkylalkoxy magnesium compound, a dialkoxy magnesium compound or a mixture of such compounds.

If an organomagnesium compound is used which is soluble in a hydrocarbon, complexes of an organomagnesium compound with aluminum may also be used, such as di(n-butyl) magnesium.1,6aluminum triethyl. Complexes with ether are also possible. Mixtures of these compounds are of course also possible.

As the transition metal compound compounds of Ti, V, Zr, Hf or a mixture of those compounds can be used.

Both trivalent and tetravalent titanium compounds can be used as the transition metal compounds. These titanium compounds have the general formula $Ti(OR^1)_{4-n}X^1_n$ or $Ti(OR^2)_{3-m}X^2_m$, where $R^1$ and $R^2$ may be the same or different and represent hydrocarbon radicals having 1–20 carbon atoms and $X^1$ and $X^2$ are halogen atoms, $0 \leq n \leq 4$ and $0 \leq m \leq 3$. A mixture of tetravalent and trivalent titanium compounds are also suitable as the transition metal compound.

Preferably, an ester of a titanic acid, for example tetrabutoxytitanium (TBT), is used for the highest increase in activity. Titanium tetrachloride ($TiCl_4$) also yields good results however. A combination of TBT and $TiCl_4$ is of course also possible. Titanium complexes such as $TiCl_3.3$-decanol, $TiCl_3.3$tetrahydrofuran, $TiCl_3.3$pyridine may also be used. Examples of other transition metal compounds are $VCl_4$, $VOCl_3$, $ZrCl_4$, $Zr(OiPr)_4$, $Zr(OBu)_4$, $Hf(OBu)_4$ and $HfCl_4$.

The molar ratio of the chloride of the organic chloride and the magnesium of the organomagnesium compound is between 1 and 10, preferably between 1.5 and 5 and in particular between 1.5 and 3.

The molar ratio of the metal of the transfer agent and magnesium of the organomagnesium compound is between 0.01 and 2, preferably between 0.1 and 1.5 and in particular between 0.1 and 1.

The molar ratio of magnesium of the organomagnesium compound and transition metal is generally between 1 and 100, preferably between 3 and 50 and in particular between 4 and 20.

The catalyst system can be prepared as follows. The organomagnesium compound is dissolved in a hydrocarbon. Suitable hydrocarbons are pentane, heptane, gasoline, etc. The organic chloride is dosed to organomagnesium compound containing hydrocarbon. Hereafter, the transfer agent is added drop by drop. The resulting mixture is then stirred for a certain length of time, which may vary from approximately 10 seconds to several hours and is heated at a temperature between 20° C. and the boiling point of the hydrocarbon, optionally under pressure. Next the transition metal compound is added and the reaction mixture is again heated at a temperature between room temperature and the boiling point of the hydrocarbon, with stirring, for a certain length of time, which may vary from approximately 10 seconds to several hours. The catalyst system does not have to be separated off by means of filtration or decanting and does not have to be washed out either. Another possible preparation method is to dissolve the transfer agent in the hydrocarbon, to which a mixture of the organomagnesium compound, hydrocarbon and the organic chloride is added. The rest of the preparation method is the same as described above. Preferably, use is made of this last method because with that method the reaction can be excellently controlled.

As already mentioned above, the use of such an organic chloride in combination with the transfer agent obviates the need to separate off the catalyst system by means of filtration or decanting and to wash it out and nevertheless the residual chlorine and titanium contents of the polyethylene are very low, certainly when compared with a conventional catalyst system such as, for example, described in EP-A-126515.

In the case of the catalyst system described in EP-A-126515 such residual contents as obtained with the catalyst system according to the invention cannot be obtained without washing. In EP-A-126515 an excess of alkylaluminum chloride is required for the chlorination of the organomagnesium compound. This means that either the excess alkylaluminum chloride has to be washed out or the chlorine content of the polyethylene is high. If a washing step takes place in the preparation of the catalyst, chlorine-containing waste is produced, which is of course highly undesirable for environmental reasons. The disadvantage of large amounts of chlorine in the polymer is that the processing equipment is corroded and that relatively high concentrations of corrosion inhibitor are required. With the aid of the catalyst system according to the invention polyethylene with very low residual chlorine concentrations is obtained while there is no need to wash out the catalyst system, which means that no waste is produced either.

It is assumed that the reaction takes place as follows. In the catalyst system according to the invention an organic chloride that does not react spontaneously with the organomagnesium compound is used. If the transfer agent is for example sesquiethylaluminum chloride (SEAC), the following mechanism is conceivable. The chlorine is transferred from the aluminum to the magnesium and at the same time the magnesium transfers a hydrocarbon group R to the aluminum so that Mg—Cl bonds (and R—Al bonds) are formed and ultimately 'MgCl$_2$'. In the meantime the organic chloride (R'—Cl) reacts with the R—Al formed to result in new Al—Cl bonds, which can in turn react with R—Mg bonds. In this way organomagnesium is chlorinated with, in this case, SEAC, while a short measure of SEAC suffices An excess of SEAC is required to be able to chlorinate the organomagnesium compound to 'MgCl$_2$' in the conventional catalyst preparation method such as, for example, described in EP-A-126515. This can be explained on the basis of the fact that SEAC does not surrender all its chlorine to the magnesium. If an organomagnesium compound is to be chlorinated with the aid of for example SEAC in a SEAC/R$_2$Mg molar ratio of 0.5 this means that there is a stoichiometric deficiency of chlorine (Cl/Mg=0.75, whereas Cl/Mg$\geq$2 is required). Even if the SEAC were to surrender all its Cl (which is hence not the case), a (more or less) quantitative formation of 'MgCl$_2$' would still not be able to take place. Most of the Cl of the 'MgCl$_2$' formed in the catalyst system according to the present invention must hence come from the organic chloride. The term 'transfer agent' has been defined on the basis of the above hypothesis for the action of for example SEAC. Although this hypothesis provides an explanation for the observed chlorination, the possibility of an entirely different mechanism cannot be excluded. The invention herewith is not restricted to any theory as to the occurring mechanism.

In addition to the catalyst A described above, the catalyst system moreover contains a cocatalyst B or a mixture of cocatalysts. The purpose of that is to make it possible to increase the activity of the system, and hence the yield of polyethylene during the polymerization, even further.

Examples of such cocatalysts B are organometallic compounds containing a metal from group 1, 2 or 13 of the Periodic System of Elements as it can be found in the "CRC Handbook of Chemistry and Physics", 70$^{th}$ Edition, 1989–1990. Preferably an organoaluminum compound is used, examples of organoaluminum compounds are triethylaluminum (TEA), triisobutylaluminum (TIBA), trioctylaluminum (TOA), triisoprenylaluminum ((iPrenyl)$_3$Al), diethylaluminum chloride (DEAC), sesquiethylaluminum chloride (SEAC), diethylaluminum hydride (DEAH), diethylaluminum ethoxide (DEALOX), methyl aluminoxane (MAO) or mixtures thereof are very suitable. TEA and DEAC are preferable.

Catalyst A and cocatalyst B may be added to the polymerization reactor separately or combined.

The molar ratio of the transfer agent of catalyst A and cocatalyst B is between 0.003:1 and 20:1, preferably between 0.04:1 and 5:1.

It is also possible to additionally dose one or more organic chlorides that do not react spontaneously with organomagnesium compound(s) to the polymerization reactor. This may lead to an additional increase in activity.

The present process relates to homo- or copolymerizing ethylene with one or more α-olefins having 3–12 carbon atoms and optionally one or more non-conjugated dienes to polyethylene. The α-olefins that are particularly suitable are propylene, 1-butylene, 1-hexene and 1-octene. It is known that the incorporation of a comonomer leads to an increase in the toughness of the polyethylene. The higher the α-olefin, the greater the toughness, which implies the following order: 1-butylene<1-hexene<1-octene. The same holds for the chemical resistance, which is also referred to as 'environmental stress crack resistance (ESCR)'.

Examples of suitable dienes are 1,7-octadiene and 1,9-decadiene.

The catalyst system according to the invention can in principle be used in gas-phase, suspension, solution or bulk polymerization. It has however been found that the catalyst system of the present invention is particularly suitable for solution polymerization of ethylene at high temperatures, of above 150° C. Preferably, the polymerization is effected at a temperature above 165° C. Generally, the polymerization temperatures do not exceed 250° C. The resulting polyethylene has in principle very low chlorine and titanium contents, which means that there is no need for the removal of residual catalyst.

Any liquid that is inert with respect to the catalyst system can be used as the dispersing agent, both in the preparation of the catalyst and in the polymerization reaction. One or more saturated, unbranched or branched aliphatic hydrocarbons such as butanes, pentanes, hexanes, heptanes, pentamethylheptane or petroleum fractions such as light or ordinary gasoline, naphtha, kerosine or gas oil are suitable. Aromatic hydrocarbons, such as benzene and toluene, are suitable but on account of the cost price and also for reasons of safety such solvents will preferably not be used in production on a technical scale. Therefore, in technical-scale polymerizations the cheap aliphatic hydrocarbons or mixtures thereof, such as those that are marketed by the petrochemical industry, will preferably be used as the solvent. Drying or purification are desirable in the case of such solvents; they can be effected without problems by a person of average skill in the art.

The polymer solution obtained in the polymerization can be worked up in a manner known per se. In general, the catalyst is deactivated at some stage in the further working-up of the polymer. This deactivation is also effected in a manner known per se. Removal of the residual catalyst from the polymer can be omitted on account of the fact that the amount of catalyst in the polymer, in particular the concentration of chlorine and transition metal, is now very low as a result of the use of the catalyst system according to the invention.

Polymerization can be effected under atmospheric pressure but also at elevated pressures of up to 300 MPa, in continuous or discontinuous mode. If the polymerization is carried out under pressure, the polymer yield can be increased even further, which results in an even lower residual catalyst content. The polymerization is preferably effected at pressures of between 0.1 and 25 MPa, in particular between 1 and 15 MPa. Pressures of 100 MPa or higher can be used if the polymerization is carried out in so-called high-pressure reactors. The catalyst according to the present invention can also be successfully used in this high-pressure process.

The molecular weight of the polymer can be controlled in the usual manner by adding hydrogen or other chain length regulators, for example alkylzinc compounds.

The polymerization can also be carried out in several steps, both in series and parallel. In these different steps the catalyst composition, temperature, hydrogen concentration, pressure, residence time, etc. may optionally be varied. In this way products with a broad molecular weight distribution can also be prepared.

The present invention will be elucidated in the following examples without being restricted thereto. The examples illustrate the high productivity at a short residence time and a high temperature in the reactor to polyethylene with a high molecular weight.

The density (d) was determined according to ASTM standard D792-66. The melt index (M.I.) was determined according to ASTM standard D1238, condition E.

The melt flow ratio (MFR) is $I_{21.6}/I_{2.16}$, where $I_{121.6}$ was determined according to ASTM standard D1238 and $I_{2.16}$ was determined according to ASTM standard D1238, condition E. This is used here as a measure of the molecular weight distribution.

EXAMPLE 1

Preparation of Catalyst A

The entire preparation process was carried out with exclusion of air and moisture and in an inert nitrogen atmosphere. All reactions were carried out while stirring with the aid of a glass stirrer.

100 ml of gasoline was introduced into a glass flask. 2.85 ml of sesquiethylaluminum chloride (SEAC, obtained from Witco) was added to that as the transfer agent. Then a mixture of 50 ml of gasoline, 50 ml of a 20% butyloctyl magnesium solution in heptane (BOMAG-A®, obtained from Witco) and 9.1 ml of isopropyl chloride was prepared. This was a clear, colourless mixture. In two hours' time this mixture was then added drop by drop, at room temperature, while stirring, to the solution of SEAC in the gasoline. A precipitate was formed. After all the BOMAG-A® had been added, the mixture obtained was stirred at room temperature for 3.5 hours. Then 1.71 ml of tetrabutoxytitanium (TBT) in 50 ml of gasoline was added, drop by drop, in 0.5 hour, to this mixture. After the TBT solution had been added the whole mixture was stirred at room temperature for two hours.

EXAMPLE 2

Preparation of Catalyst A

Preparation as described in Example 1, with 10.4 ml of 1-chlorobutane being used instead of isopropyl chloride.

EXAMPLE 3

Preparation of Catalyst A

Preparation as described in Example 1, with 10.6 ml of 2-chlorobutane being used instead of isopropyl chloride.

EXAMPLE 4

Preparation of Catalyst A

Preparation as described in Example 3, but now 1.24 ml of diethylaluminum chloride (DEAC) was used as transfer agent.

EXAMPLE 5

Preparation of Catalyst A

Preparation as described in Example 3, but now 0.28 ml of SEAC was used.

EXAMPLE 6

Preparation of Catalyst A

Preparation as described in Example 5, but now 0.55 ml of $TiCl_4$ was used instead of TBT.

EXAMPLE 7

Preparation of Catalyst A

Preparation as described in Example 3, but now the amount of transfer agent was 4 ml.

EXAMPLE 8

Preparation of Catalyst A

Preparation as described in Example 3, but now 1.9 g of monoethylaluminum chloride (MEAC) was used as the transfer agent.

EXAMPLE 9

Preparation of Catalyst A

Preparation as described in Example 3, but now using 3.8 ml of TBT.

EXAMPLE 10

Preparation of Catalyst A

Preparation as described in Example 3, with instead of TBT a mixture of 1.71 ml TBT and 2.36 g zirconiumtetrachloride ($ZrCl_4$) was used. This mixture was first prepared by adding 50 ml of gasoline to 50 ml toluene and while continuously stirring further adding 6.2 g $ZrCl_4$ and 4.5 ml of $Ti(OBu)_4$.

EXAMPLES 11–16

Polymerization

A series of continuous (co)polymerizations were carried out in a double-walled autoclave with a volume of 2 liters. To this end the autoclave was completely filled with a gasoline (this is a mixture of aliphatic hydrocarbons with a boiling range of 65–70° C.). Gasoline (5.50 kg/hour), ethylene (1270 g/hour) and octene (810 g/hour) were continuously dosed to this reactor to prepare an ethylene-octene copolymer. A certain amount of hydrogen was also dosed. The reaction temperature was 185° C. The pressure was maintained at such a level that the autoclave remained completely full. An amount of catalyst was continuously dosed to the autoclave. An amount of triethylaluminum (TEA), as cocatalyst B, was dosed to this catalyst. The cocatalyst B and the catalyst were mixed for 20 seconds before being dosed to the autoclave. In Examples 11–16 the polymerizations were carried out with the aid of the catalysts of Examples 1–6. The polymerization results are shown in Table 1. 'Cat. dose' refers to the sum of the masses of the metals and halogens of catalyst A per hour. 'Residual titanium' and 'residual chlorine' refer to the residual concentrations of titanium and chlorine, respectively, in the polyethylene. The product properties of the polyethylene are indicated in Table 4.

TABLE 1

| Example | Cat. dose mg/h | [TEA] mmol/l | H$_2$ dose Nl/h | degree of ethylene conversion % | residual titanium ppm | residual chlorine ppm |
|---|---|---|---|---|---|---|
| 11 | 185 | 0.15 | 0.50 | 93.8 | 4 | 90 |
| 12 | 340 | 0.15 | 0.50 | 89.6 | 7 | 165 |
| 13 | 155 | 0.15 | 0.50 | 92.6 | 3 | 75 |
| 14 | 170 | 0.15 | 0.80 | 92.9 | 4 | 80 |
| 15 | 250 | 0.18 | 0.90 | 87.3 | 8 | 135 |
| 16 | 230 | 0.20 | 0.85 | 93.3 | 5 | 120 |

EXAMPLES 17–23

Polymerization

The polymerizations were carried out as described in Examples 11–16. In Examples 17 and 18 use was made of the catalyst of Example 7. In Examples 19 and 20 use was made of the catalyst of Example 8. In Examples 21 and 22 use was made of the catalyst of Example 9. In Example 23 use was made of the catalyst of Example 10. Isopropyl chloride was supplied to the autoclave directly, as an additional compound that does not react spontaneously with an organomagnesium, so that the concentration in the autoclave was 0.025 mmol/l. TEA was dosed directly to the autoclave as cocatalyst B. The polymerization results are shown in Table 2.

The product properties of the polyethylene are shown in Table 4.

TABLE 2

| Example | Cat. dose mg/h | [TEA] mmol/l | H$_2$ dose Nl/h | degree of ethylene conversion % | residual titanium ppm | residual chlorine ppm |
|---|---|---|---|---|---|---|
| 17 | 80 | 0.10 | 1.0 | 93.4 | 2 | 40 |
| 18 | 82 | 0.075 | 1.0 | 93.1 | 2 | 45 |
| 19 | 160 | 0.10 | 1.0 | 93.2 | 4 | 90 |
| 20 | 140 | 0.15 | 1.0 | 94.1 | 4 | 75 |
| 21 | 130 | 0.20 | 1.0 | 92.8 | 6 | 70 |
| 22 | 115 | 0.10 | 1.0 | 93.7 | 6 | 60 |
| 23 | 435 | 0.14 | 1.0 | 92.4 | 9 | 250 |

EXAMPLES 24–26

Preparation of Catalyst A and Polymerization

Catalyst A was prepared as follows. Isopropyl chloride (IpCl) was used as the chloride that does not react sponta-neously with an organomagnesium compound. This was mixed with BOMAG-A® in a storage tank. A Cl:Mg molar ratio of 2.2:1 was used. 0.46 mmol/h SEAC was used as the transfer agent. TiCl$_4$ dissolved in gasoline was used as the transition metal compound. The IpCl/BOMAG-A® mixture, SEAC and TiCl$_4$ were successively dosed to the supply line to the autoclave. In this supply line mixing of BOMAG-A®, IpCl and SEAC took place for about 50 seconds. After the dosage of TiCl$_4$ it was about another 20 seconds before introduction into the autoclave took place. TEA was used as cocatalyst B. 0.1 Nl/h hydrogen was used as a chain length regulator.

The other polymerization conditions were as described for Examples 11–16. The polymerization results are shown in Table 3.

The product properties of the polyethylene are given in Table 4.

TABLE 3

| Example | [TiCl$_4$] mmol/l | [Mg] mmol/l | degree of ethylene conversion % | residual titanium ppm | residual chlorine ppm |
|---|---|---|---|---|---|
| 24 | 0.0120 | 0.06 | 94.1 | 4 | 61 |
| 25 | 0.0120 | 0.05 | 92.2 | 4 | 58 |
| 26 | 0.0125 | 0.07 | 94.2 | 4 | 66 |

TABLE 4

| Example | MI dg/min | MFR | d kg/m$^3$ |
|---|---|---|---|
| 11 | 3.9 | 29.5 | 918 |
| 12 | 1.9 | 28.8 | 928 |
| 13 | 4.4 | 29.1 | 920 |
| 14 | 3.0 | 28.1 | 922 |
| 17 | 2.7 | 27.8 | 920 |
| 18 | 2.2 | 28.3 | 918 |
| 19 | 2.4 | 26.5 | 918 |
| 20 | 3.2 | 26.9 | 920 |
| 21 | 1.1 | 23.6 | 928 |
| 22 | 1.0 | 26.5 | 924 |
| 23 | 11 | 29.7 | 915 |
| 24 | 3.0 | 36.7 | 922 |
| 25 | 2.7 | 36.2 | 924 |
| 26 | 3.1 | 36.6 | 923 |

These examples clearly show that the catalyst system according to the invention is very active, judging from the low residual contents and the degrees of ethylene conversion obtained. As is apparent from Table 4, Examples 11–22 versus Examples 23–26, the molecular weight distribution, expressed in MFR, can be excellently controlled via the different preparation methods for catalyst A.

EXAMPLE 27

Preparation of Catalyst A

The entire preparation process was carried out with exclusion of air and moisture and in an inert nitrogen atmosphere. All reactions were carried out while stirring with the aid of a glass stirrer.

5 ml of gasoline was introduced into a glass flask. 4.5 ml of SEAC (1 mol/l) was added to that as the transfer agent. Then a mixture of 25 ml gasoline, 15 ml of a 15% solution of butyloctyl magnesium with 0.14% diethylether in heptane (BOMAG-D® obtained from Witco) and 2.20 ml of 2-chlorobutane was prepared. This was a clear and colourless mixture. In two hours' time this mixture was then added drop by drop, at room temperature, while stirring, to the solution of SEAC in gasoline. A precipitate was formed. After all BOMAG-D® had been added, the mixture obtained was stirred at room temperature for 3.5 hours. Then 0.31 ml TBT in 25 ml gasoline was added, drop by drop, in 0.5 hour, to this mixture. After the TBT solution had been added the whole mixture was stirred at room temperature for two hours.

EXAMPLE 28

Preparation of Catalyst A

The entire preparation process was carried out with exclusion of air and moisture and in an inert nitrogen atmosphere. All reactions were carried out while stirring with the aid of a glass stirrer.

10 ml of gasoline and 0.51 ml of SEAC were introduced into a glass flask. A mixture of 20 ml gasoline, 9 ml of a 20% solution of butyloctyl magnesium ethoxide in heptane (BOMAG-O® obtained from Witco) and 2.19 ml of 2-chlorobutane was prepared. In two hours' time this mixture was then added at room temperature, while stirring, to the solution of SEAC in gasoline. A precipitate was formed. After all BOMAG-O® had been added, the mixture obtained was stirred at room temperature for 3.5 hours. Then 0.31 ml TBT in 20 ml gasoline was added, drop by drop, in 0.5 hour, to this mixture. After the TBT solution had been added the mixture was stirred for two hours.

EXAMPLE 29

Preparation of Catalyst A

Preparation as described in Example 27, with 10 ml (20%) BOMAG-A® instead of 15 ml BOMAG-D® and 2.15 ml cyclopentylchloride instead of 2.20 ml 2-chlorobutane.

EXAMPLE 30

Preparation of Catalyst A

Preparation as described in Example 29, with 3.20 ml 3-chloroheptane instead of 2.15 ml cyclopentylchloride.

EXAMPLE 31

Preparation of Catalyst A

Preparation as described in Example 29, with 1.08 ml 2,2-dichloropropane instead of 2.15 ml cyclopentylchloride.

EXAMPLE 32

Preparation of Catalyst A

Preparation as described in Example 29, with a mixture of 1.08 ml 1-chlorobutane and 1.10 ml 2-chlorobutane instead of 2.15 ml cyclopentylchloride.

EXAMPLE 33

Preparation of Catalyst A

Preparation as described in Example 32, with 2.11 ml 1-chlorodecane instead of 1-chlorobutane.

EXAMPLE 34

Preparation of Catalyst A

Preparation as described in Example 28, with 10.1 ml BOMAG-A® instead of BOMAG-O® and with a mixture of 0.55 ml 2-chlorobutane and 1.62 ml 1-chlorobutane instead of 2-chlorobutane. The mixture was added in such a way that first during 0.5 hour 2-chlorobutane was added and after the complete addition of this compound 1-chlorobutane was added during 1.5 hours.

EXAMPLE 35

Preparation of Catalyst A

Preparation as described in Example 34, with 2.16 ml 1-chlorobutane instead of a mixture of 2-chlorobutane and 1-chlorobutane and 0.57 g of monoethylaluminum dichloride (MEAC) instead of SEAC.

EXAMPLE 36

Preparation of Catalyst A

Preparation as described in Example 35, with 0.1 ml $TiCl_4$ instead of TBT.

EXAMPLE 37

Preparation of Catalyst A

Preparation as described in Example 35, with 0.60 g aluminumtrichloride ($AlCl_3$) instead of MEAC.

EXAMPLE 38

Preparation of Catalyst A

Preparation as described in Example 34, with 2.19 ml 2-chlorobutane instead of a mixture of 2-chlorobutane and 1-chlorobutane. 1.23 g zincdichloride ($ZnCl_2$) was used as transfer agent.

After the preparation of the $MgCl_2$ (before the addition of the transition metal compound) 0.37 ml triethylaluminum (TEA) was added. 0.11 ml $TiCl_4$ was used as transition metal compound.

EXAMPLE 39

Preparation of Catalyst A

Preparation as described in Example 38, with 15 ml BOMAG-D® instead of BOMAG-A®. No TEA was added.

EXAMPLES 40–52

Polymerization

A series of batch (homo)polymerization reactions were carried out in a 1.3 l reactor which was filled with 1 bar of hydrogen. 500 ml of pentamethylheptane (PMH) was dosed to the reactor and ethylene was supplied until the total pressure in the reactor was 20 bar. The reactor was heated to the desired polymerization temperature of 185° C. The necessary amount of triethylaluminum, as cocatalyst B, and the catalyst A were mixed at room temperature, after which this mixture was dosed to the polymerization reactor. The pressure in the polymerization reactor was kept at a constant level by means of ethylene supply. After 10 minutes the reaction was stopped and the obtained polymer solution was cooled down upon which the polymer could be separated from the rest of the solution. In Examples 40–52 the polymerization reactions were carried out with the aid of the catalysts of Examples 27–39. The polymerization results are shown in Table 5. [Ti] refers to the concentration of titanium in the reactor. [TEA] refers to the concentration of triethylaluminum in the reactor.

TABLE 5

| Example | [Ti] mmol/l | (TEA) mmol/l | residual titanium ppm | residual chlorine ppm |
|---|---|---|---|---|
| 40 | 0.0015 | 0.05 | 2.4 | 67 |
| 41 | 0.0060 | 0.20 | 4.9 | 132 |
| 42 | 0.0015 | 0.05 | 1.9 | 54 |
| 43 | 0.0014 | 0.05 | 1.9 | 53 |
| 44 | 0.0017 | 0.05 | 2.4 | 62 |
| 45 | 0.0015 | 0.05 | 2.0 | 60 |
| 46 | 0.0017 | 0.05 | 2.4 | 57 |
| 47 | 0.0031 | 0.20 | 5.6 | 137 |
| 48 | 0.0019 | 0.05 | 3.2 | 67 |
| 49 | 0.0016 | 0.05 | 2.4 | 63 |
| 50 | 0.0020 | 0.05 | 2.0 | 62 |
| 51 | 0.0032 | 0.05 | 5.5 | 114 |
| 52 | 0.0036 | 0.10 | 6.1 | 133 |

What we claim is:

1. A process for homopolymerizing ethylene or copolymerizing ethylene with one or more α-olefins having 3–12 carbon atoms and optionally one or more non-conjugated dienes under effective polymerization conditions at a temperature above 150° C. in the presence of a catalyst system comprising a catalyst A and at least one cocatalyst B, said catalyst A being a product obtained from constituents (a), (b), (c) and (d):
(a) at least one magnesium compound represented by the general formula $R^1 R^2 Mg$, in which $R^1$ and $R^2$ are alkyl- or alkoxy groups with 1–12 carbon atoms, provided that $R^1$ and $R^2$ may be the same or different,
(b) an organic chloride that does not react spontaneously with said at least one magnesium compound,
(c) a transition metal compound that consists of one selected from the group of compounds of Ti, Zr, Hf and a mixture thereof, and
(d) at least one transfer agent consisting essentially of at least one selected from the group consisting of organoaluminum compounds, organoboron chlorides, organozinc compounds,
wherein the transfer agent and magnesium compound are such that the molar ratio between the metal of the transfer agent and the magnesium of the magnesium compound is between 0.1 and 1; and
said cocatalyst B comprising at least one organometallic compound with a metal from Group 1, 2, or 13 of the Periodic System of Elements.

2. A process for homopolymerizing ethylene or copolymerizing ethylene with one or more α-olefins having 3–12 carbon atoms and optionally one or more non-conjugated dienes under effective polymerization conditions at a temperature greater than 150° C. in the presence of a catalyst A and at least one cocatalyst B, said catalyst A being a product obtained from constituents (a), (b), (c) and (d):
(a) at least one magnesium compound represented by the general formula $R^1 R^2 Mg$, in which $R^1$ and $R^2$ are alkyl- or alkoxy groups with 1–12 carbon atoms, provided that $R^1$ and $R^2$ may be the same or different
(b) an organic chloride that does not react spontaneously with said at least one magnesium compound,
(c) a transition metal compound that consists of at least one selected from the group of compounds of Ti, Zr, and Hf, and
(d) at least one transfer agent which is aluminum trichloride or zinc chloride,
wherein the transfer agent and magnesium compound are such that the molar ratio between the metal of the transfer agent and the magnesium of the magnesium compound is between 0.1 and 1; and
said cocatalyst B comprising at least one organometallic compound with a metal from Group 1, 2, or 13 of the Periodic System of Elements.

3. A process for homopolymerizing ethylene or copolymerizing ethylene with one or more α-olefins having 3–12 carbon atoms and optionally one or more non-conjugated dienes under effective polymerization conditions at a temperature above 150° C. in the presence of a catalyst system comprising a catalyst A and at least one cocatalyst B,
said catalyst A consisting essentially of a product obtained from components consisting essentially of (a), (b), (c) and (d):
(a) at least one magnesium compound represented by the general formula $R^1 R^2 Mg$, in which $R^1$ and $R^2$ are alkyl- or alkoxy groups with 1–12 carbon atoms, provided that $R^1$ and $R^2$ may be the same or different,
(b) an organic chloride that does not react spontaneously with said at least one magnesium compound,
(c) a transition metal compound consisting of at least one selected from the group of compounds of Ti, Zr, and Hf and a mixture thereof, and
(d) at least one transfer agent selected from the group consisting of organoaluminum compounds, organoboron chlorides, organozinc compounds and a mixture of any thereof,
wherein the transfer agent and magnesium compound are such that the molar ratio between the metal of the transfer agent and the magnesium of the magnesium compound is between 0.1 and 1; and
said cocatalyst B comprising at least one organometallic compound with a metal from Group 1, 2, or 13 of the Periodic System of Elements.

4. The process according to claim 3, wherein the organic chloride is a primary mono- or di-(chloride) substituted alkyl, alkenyl, aryl or alkaryl chloride, the alkyl, alkenyl, aryl or alkaryl group containing 1–20 carbon atoms, or a mixture of two or more primary organic chlorides.

5. The process according to claim 4, wherein the organic chloride is 1-chlorobutane, 1-chloropropane, chloroethane or a mixture thereof.

6. The process according to claim 3, wherein the organic chloride is a secondary mono- or di-(chloride) substituted alkyl, alkenyl, aryl or alkaryl chloride, the alkyl, alkenyl, aryl or alkaryl group containing 1–20 carbon atoms, or a mixture of two or more secondary organic chlorides.

7. The process according to claim 6, wherein the organic chloride is 2-chloroheptane, 3-chloroheptane, 2-chlorobutane, 2-chloropropane or a mixture thereof.

8. The process according to any one of claim 3, 4, 5, 6, or 7, wherein the organic chloride is a mixture of one or more primary and one or more secondary organic chlorides.

9. The process according to claim 3, wherein the organic chloride is a poly-(chloride)substituted alkyl, alkenyl, aryl or alkaryl chloride, said alkyl, aryl or alkaryl group containing 1–20 carbon atoms.

10. The process according to claim 3, wherein the organoaluminum compound is an organo aluminum chloride.

11. The process according to claim 10, wherein the organoaluminum chloride is ethylaluminum dichloride, diethylaluminum chloride, sesquiethylaluminum chloride or a mixture thereof.

12. The process according to claim 3, wherein the magnesium compound is ethylbutylmagnesium, butyloctylmagnesium, dibutylmagnesium and/or dihexylmagnesium.

13. The process according to claim 3, wherein the at least one magnesium compound is converted with at most two molar equivalents of an alcohol, relative to the magnesium, into an alkylalkoxy magnesium compound, a dialkoxy magnesium compound or a mixture thereof.

14. The process according to claim 13, wherein the at least one transition metal compound is a titanium compound represented by the general formula $Ti(OR^1)_{4-n}X^1_n$ or $Ti(OR^2)_{3-m}X^2_m$, where $R^1$ and $R^2$ may be the same or different and represent hydrocarbon radicals having 1–20 carbon atoms, $X^1$ and $X^2$ are halogen atoms, $0<n<4$ and $0<m<3$.

15. The process according to claim 14, wherein the titanium compound is tetrabutoxytitanium, $TiCl_4$, or a mixture thereof.

16. The process according to claim 3, wherein the molar ratio between the chloride of the organic chloride and the magnesium of the magnesium compound is between 1 and 10.

17. The process according to claim 3, wherein the ratio between the magnesium of the magnesium compound and the metal of the transition metal compound is between 1 and 100.

18. The process according to claim 3, wherein the cocatalyst B is an organoaluminum compound.

19. The process according to claim 3, wherein said process is conducted in a polymerization reactor and wherein in addition to the catalyst system, one or more organic chlorides that do not react spontaneously with magnesium compounds is or are added to the polymerization reactor.

20. The process according to claim 3, wherein the organometallic compound is at least one member from the group consisting of triethylaluminum, triisobutylaluminum, trioctylaluminum, triisoprenylaluminum diethylaluminum chloride, sesquiethylaluminum chloride, diethylaluminum hydride, diethylaluminum ethoxide, methylaluminoxane and a mixture of any thereof.

21. The process according to claim 3, wherein said at least one organometallic compound comprises at least one of triethylaluminum or diethylaluminum chloride.

22. The process according to claim 3, wherein said process is conducted in at least one polymerization reactor, and said catalyst A and said cocatalyst B are combined before being introduced into said polymerization reactor.

23. The process according to claim 3, wherein said process is conducted in at least one polymerization reactor, and said catalyst A and said cocatalyst B are separately dosed to said polymerization reactor.

24. A process according to claim 3, wherein the at least one transition metal compound is an ester of a titanic acid.

* * * * *